UNITED STATES PATENT OFFICE 2,045,817

CONDENSATION PRODUCTS OF THE ANTHRAQUINONE SERIES

Werner Zerweck and Ernst Honold, Frankfort-on-the-Main-Fechenheim, Germany, assignors to General Aniline Works, Inc., New York, N. Y., a corporation of Delaware No Drawing. Application January 17, 1935, Serial No. 2,304. In Germany January 20, 1934

6 Claims. (Cl. 260—44)

Our invention relates to new condensation products of the anthraquinone series, particularly those corresponding to the general formula:

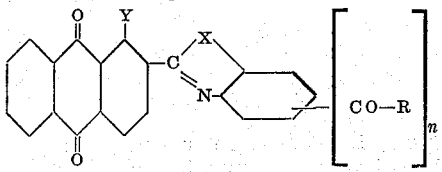

wherein the benzene nucleus may be replaced by a naphthalene nucleus, $n$ means the number 1 or 2, X stands for S or O, Y for hydrogen or $NH_2$, R for OH, halogen, $NH_2$ or the radicle

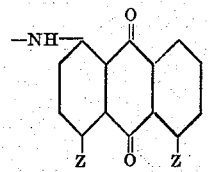

wherein the Z's mean hydrogen or one of them an acylamino group and the other hydrogen.

The new mono- and dicarboxylic acids of the thiazolic and oxazolic series corresponding to the above general formula, R being OH, are obtainable by condensing anthraquinone-2-aldehyde or 1-aminoanthraquinone-2-aldehyde with ortho-amino-mercapto- or ortho-amino-hydroxy-mono- or dicarboxylic acids of the benzene or naphthalene series. Their chlorides are obtainable according to the usual methods by boiling the acids with thionylchlorides or phosphorus chlorides in the presence of an organic diluent. The chlorides are mostly crystalline substances of a high melting point. The corresponding amides are obtainable by decomposing the chlorides by gently warming them after the addition of aqueous ammonia. They are likewise crystalline substances mostly of a high melting point.

When condensing the said carboxylic acids or their halides with α-aminocompounds of the anthraquinone series, advantageously in the presence of organic solvents, or conversely when condensing amides of the said carboxylic acids with α-halogen-compounds of the anthraquinone series, new condensation products are obtained corresponding to the above general formula, R being an aminoanthraquinonyl radicle. They are valuable vat dyestuffs of great tinctorial power which dye the vegetable fibers fast yellow to red to brown to violet shades.

In order to further illustrate our invention the following examples are given. However we wish it to be understood that our invention is not limited to the particular products or reaction conditions stated therein.

Example 1

Para-aminobenzoic acid is treated according to U. S. Patent No. 1,637,023 with disulphurdichloride and the formed thiazthioniumchloride is saponified, according to U. S. Patent No. 1,788,297, to the 1-amino-2-mercapto-benzene-4-carboxylic acid which may be isolated in the form of the zinc mercaptide. For further condensation the free acid may be boiled with anthraquinone-2-aldehyde in the presence of a high boiling organic solvent with addition of sodium carbonate or acetate or advantageously the solution of the anthraquinone-2-aldehyde in about a five fold quantity of concentrated sulfuric acid may be slowly added to about a twenty-five fold amount of glacial acetic acid, and after the addition of the zincmercaptide of the ammino-mercapto-benzoic acid, the mixture may be boiled for some hours in an apparatus provided with a reflux condenser. By adding water the formed 1-(2'-anthraquinonyl)-benzothiazole-5-carboxylic acid of the formula:

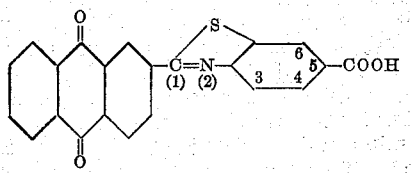

is entirely precipitated.

When starting from anthranilic acid according to the same scheme of operations, the 1-(2'-anthraquinonyl) - 5 - chlorobenzothiazole - 3 - carboxylic acid of the formula:

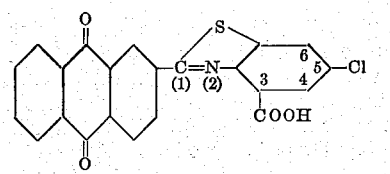

is obtained.

40 parts of the 1-(2'-anthraquinonyl)-benzothiazole-5-carboxylic acid chloride are mixed with 23 parts of 1-amino-anthraquinone and about 300 parts of ortho-dichlorobenzene and the mixture is boiled for an hour in an apparatus provided with a reflux condenser. The condensation product which partly precipitates even when the mixture is hot is filtered off when the mixture is cold, washed and dried. It corresponds to the formula:

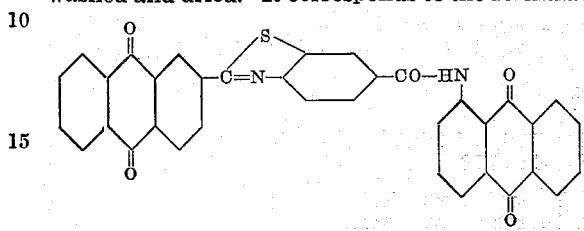

and dyes cotton from a dark brownish violet vat very fast yellow shades. It dissolves in concentrated sulfuric acid with a brown color.

The same dyestuff is formed by decomposing the 1-(2'-anthraquinonyl)-benzothiazole-5-carboxylic acid amide with 1-chloro-anthraquinone with the addition of a highly boiling diluent, an acid binding agent such as potassium acetate and a copper compound acting as catalyst.

When acting with 1-aminoanthraquinone on the 1-(2'-anthraquinonyl)-5-chlorobenzothiazole-3-carboxylic acid chloride a yellow dyestuff is obtained.

*Example 2*

When 35 parts of 1-amino-5-benzoylamino-anthraquinone are condensed in the manner described in Example 1 with 40 parts of 1-(2'-anthraquinonyl)-benzothiazole-5-carboxylic acid chloride a dyestuff of the formula:

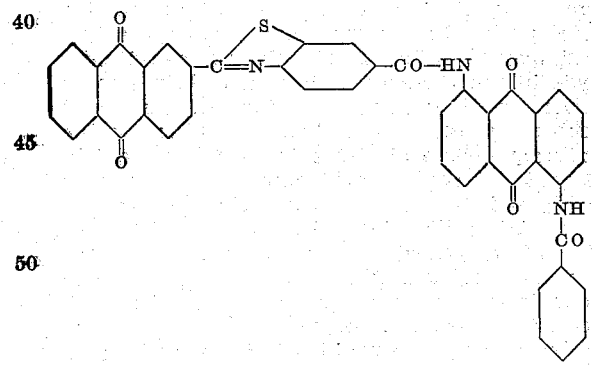

is obtained. It dissolves in concentrated sulfuric acid with a brown color and dyes cotton from a dark violet vat, yellow shades of good fastness, particularly to chlorine. When condensing the same carboxylic acid chloride with 1-amino-4-benzoylaminoanthraquinone or with 1-amino-4-acetylamino-anthraquinone orange dyestuffs are obtained. When condensing one molecular proportion of 1.5-diaminoanthraquinone with two molecular proportions of the said carboxylic acid chloride, a yellow dyestuff is formed.

*Example 3*

42 parts of 1-(1'-amino-2'-anthraquinonyl)-benzothiazole-5-carboxylic acid chloride are condensed with 23 parts of 1-aminoanthraquinone by heating with the addition of 400 parts of nitrobenzene at about 200° C. for about 1 hour. When cool the condensation product is isolated. It dissolves in concentrated sulfuric acid with a yellowish brown color turning to bluish green after the addition of paraformaldehyde. The new dyestuff of the formula:

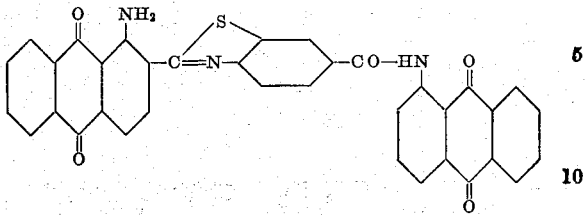

dyes cotton from a blue vat, red shades of good fastness, particularly to chlorine.

When condensing 42 parts of the same carboxylic acid chloride with 35 parts of 1-amino-5-benzoylamino-anthraquinone the formed dyestuff of the formula:

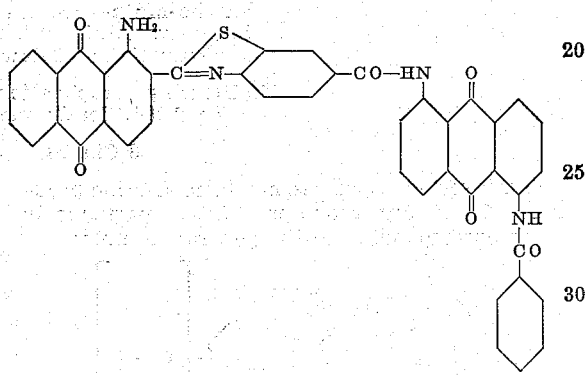

is obtained. It dissolves in concentrated sulfuric acid with a brown color turning to blue after the addition of paraformaldehyde and dyes cotton from a blue vat, fast reddish brown shades.

A similar dyestuff is obtained when condensing 1-amino-5-benzoylamino-anthraquinone with the chloride of the formula:

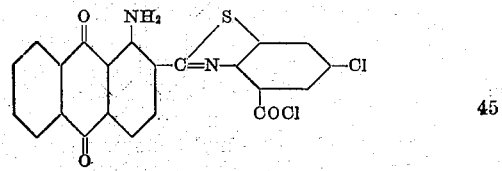

When using, as one component, 1-amino-4-benzoylamino-anthraquinone dyestuffs are obtained which dye reddish violet shades from a blue vat.

*Example 4*

When condensing 42 parts of the 1-(1'-amino-2'-anthraquinonyl)-benzothiazole-5-carboxylic acid chloride with 12 parts of 1,4-diaminoanthraquinone by boiling a mixture thereof with trichlorobenzene the formed condensation product of the formula:

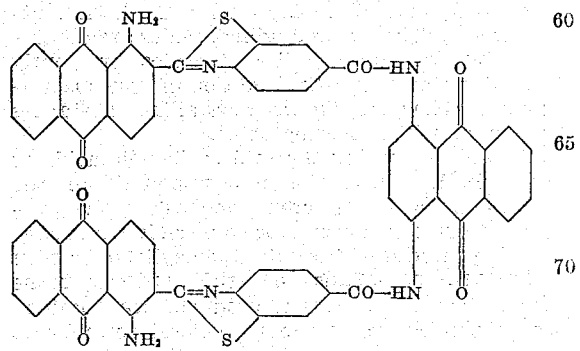

is obtained. It dissolves in concentrated sulfuric acid with a brown color turning to blue after the addition of paraformaldehyde and dyes cotton from a blue vat fast reddish violet shades.

The condensation of 1.5-diaminoanthraquinone with two molecular proportions of an amino anthraquinonyl-benzo-thiazole-carboxylic acid chloride yields fast bluish red dyestuffs.

*Example 5*

1-amino-2,4-isophthalic acid is treated in the presence of glacial acetic acid with disulfurdichloride according to U. S. Patent No. 1,637,023 and the formed thiazthioniumchloride is saponified according to U. S. Patent No. 1,788,297 to the 1-amino-6-mercaptobenzene-2,4-dicarboxylic acid. The zinc-mercaptide thereof is then condensed in the presence of sulfuric acid and glacial acetic acid with anthraquinone-2-aldehyde or 1-aminoanthraquinone-2-aldehyde. The formed 1-(2'-anthraquinonyl)-benzothiazole-3,5-dicarboxylic acid of the formula:

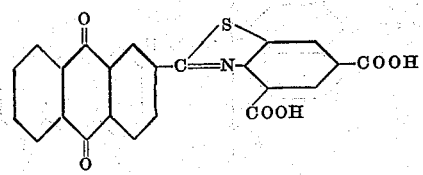

and the 1-(1'-amino-2'-anthraquinonyl)-benzothiazole-3,5-dicarboxylic acid can be converted into the corresponding dichlorides for instance by means of thionylchloride.

46 parts of the 1-(2'-anthraquinonyl)-benzothiazole-3,5-dicarboxylic acid dichloride and 46 parts of 1-amino-anthraquinone are dissolved in about 600 parts of nitrobenzene and the mixture is held while stirring at 160° to 180° C. for about an hour. The condensation product which separates even from the hot mixture is isolated. It corresponds to the formula:

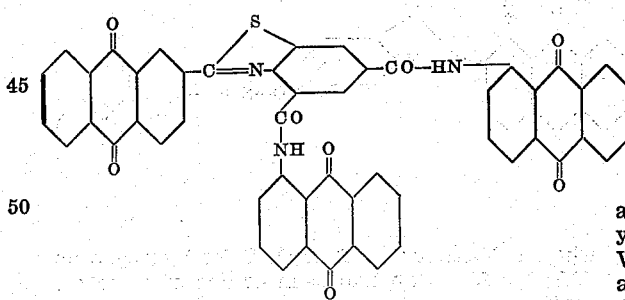

and dissolves with an orange color is concentrated sulfuric acid. It dyes cotton from a brownish violet vat very fast yellow shades.

A more reddish yellow dyestuff is obtained when using as second component two molecular proportions of 1-amino-5-benzoylamino-anthraquinone.

When condensing 1-(1'-amino-2'-anthraquinonyl)-benzothiazole-3,5-dicarboxylic acid dichloride with two molecular proportions of 1-aminoanthraquinone a dyestuff dyeing cotton fast bluish red shades is obtained.

*Example 6*

Equivalent amounts of 1-amino-2-hydroxy-5-benzoic acid and anthraquinone-2-aldehyde are condensed by boiling for some hours with the addition of a high boiling diluent and sodium carbonate or acetate. When cool the precipitated condensation product is isolated and purified by treatment with hydrochloric acid and water vapour. It is converted into the chloride. 39 parts of this chloride of the formula:

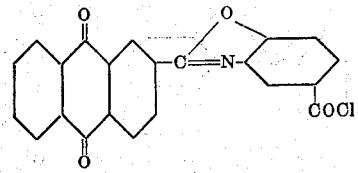

are mixed with 23 parts of 1-aminoanthraquinone and about 300 parts of o-dichlorobenzene and the mixture is boiled in an apparatus provided with a reflux condenser for about an hour. When cool the condensation product of the formula:

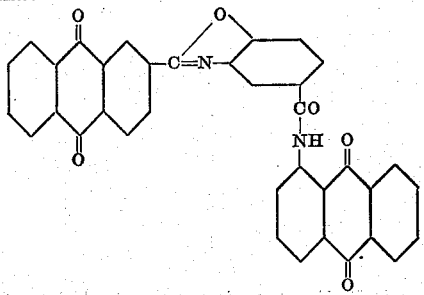

is isolated. It dyes cotton from a dark olive-brown vat very fast yellow shades.

When condensing 1-(2'-anthraquinonyl)-benzoxazol-4-carboxylic acid amide (obtainable by decomposing the chloride with aqueous ammonia) with 1-chloroanthraquinone in the presence of a high boiling diluent with the addition of an acid binding agent such as potassium acetate and of a copper compound acting as catalyst the same dyestuff is obtained.

When condensing 39 parts of 1-(2'-anthraquinonyl)-benzoxazole-4-carboxylic acid chloride with 35 parts of 1-amino-5-benzoylamino-anthraquinone a dyestuff is produced, which dyes yellow shades from a dark brownish olive vat. When using 35 parts of 1-amino-4-benzoylamino-anthraquinone, as second component, an orange dyestuff is obtained. When condensing 1,5-diaminoanthraquinone with two molecular proportions of the chloride, a yellow dyestuff is obtained.

*Example 7*

43 parts of 1-(2'-anthraquinonyl)-3,4-benzobenzoxazole-6-carboxylic-acid chloride of the formula:

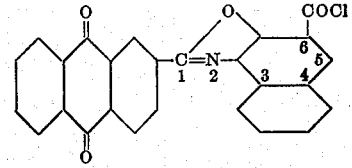

obtainable by condensing anthraquinone-2-aldehyde with 1-amino-2-hydroxynaphthalene-3-carboxylic acid and converting the formed acid into its chloride, are mixed with 23 parts of 1-aminoanthraquinone and about 400 parts of nitrobenzene and the mixture is heated at about 200° C. for about an hour. The condensation product is isolated when cold. It corresponds to the formula:

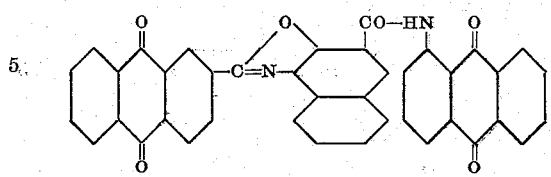

This dyestuff dissolves in concentrated sulfuric acid with a reddish brown color and dyes cotton from a dark brown vat very fast yellow shades.

When using as second component 1-amino-5-benzoylamino-anthraquinone a yellow dyestuff is formed. When using 1-amino-4-benzoylamino-anthraquinone an orange dystuff is obtained.

*Example 8*

45 parts of the 1-(1'-amino-2'-anthraquinonyl) - 3,4 - benzobenzoxazole-6 - carboxylic acid chloride, obtainable by condensing the 1-aminoanthraquinone-2-aldehyde with 1-amino-2-hydroxynaphthalene-3-carboxylic acid and converting the formed acid into its chloride, are condensed with 23 parts of 1-aminoanthraquinone in the presence of boiling trichlorobenzene. When cold the condensation product is isolated. The new dyestuff has the formula:

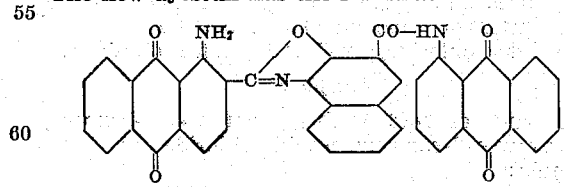

It dyes cotton from a reddish violet vat fast bluish red shades.

When using 35 parts of 1-amino-5-benzoylaminoanthraquinone as second component a fast red dyeing dyestuff is obtained.

We claim:

1. Condensation products selected from the class consisting of those corresponding to the general formulae:

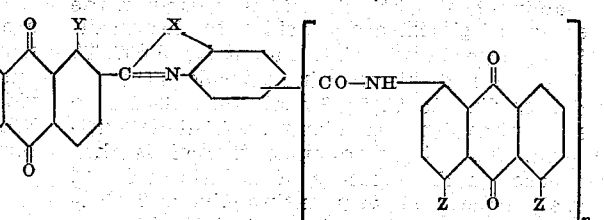

and

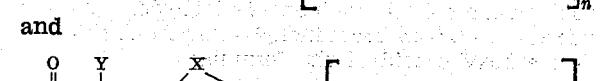

wherein $n$ means the numbered 1 or 2, X stands for S or O, Y for hydrogen or $NH_2$, the Z's mean hydrogen or one of them an acylamine-group and the other hydrogen, which dyestuffs dissolve in concentrated sulfuric acid with an orange to brownish color and dye the vegetable fibers from a brownish to violet to bluish vat fast yellowish to reddish to brownish to violet shades.

2. Condensation products corresponding to the general formula:

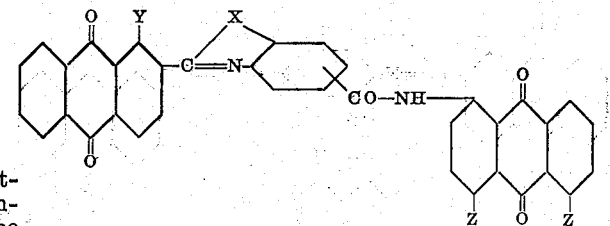

wherein X stands for S or O, Y for hydrogen or $NH_2$, the Z's mean hydrogen or one of them an acylamino-group and the other hydrogen, which dyestuffs dissolve in concentrated sulfuric acid with an orange to brownish color and dye the vegetable fibers from a brownish to violet to bluish vat fast yellowish to reddish to brownish to violet shades.

3. Condensation products corresponding to the general formula:

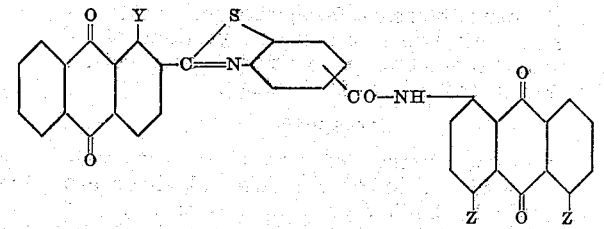

wherein Y stands for hydrogen or $NH_2$, the Z's mean hydrogen or one of them an acylamino group and the other hydrogen, which dyestuffs dissolve in concentrated sulfuric acid with an orange to brownish color and dye the vegetable fibers from a brownish to violet to bluish vat fast yellowish to reddish to brownish to violet shades.

4. The condensation product of the formula:

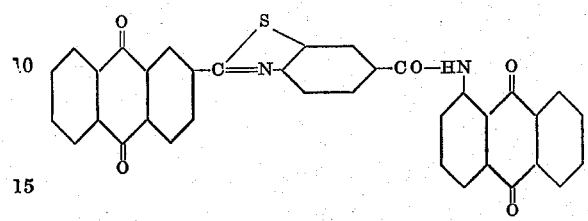

which dissolves in concentrated sulfuric acid with a brownish color and dyes cotton from a dark brownish violet vat fast yellow shades.

5. The condensation product of the formula:

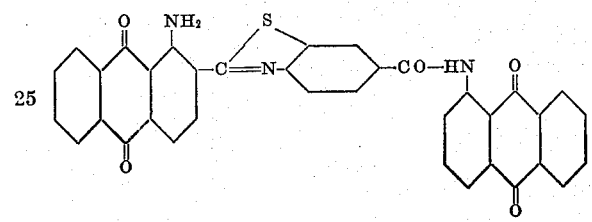

which dyestuff dyes cotton from a blue vat red shades of a good fastness particularly to chlorine.

6. The condensation product of the formula:

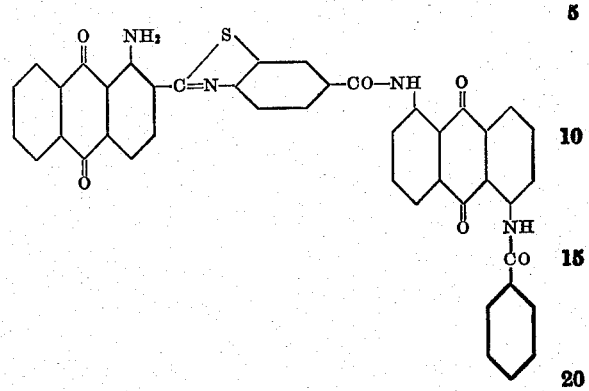

which dyestuff dissolves in concentrated sulfuric acid with a brown color turning to blue after the addition of paraformaldehyde and dyes cotton from a blue vat fast reddish brown shades.

WERNER ZERWECK.
ERNST HONOLD.